July 1, 1969 — J. A. FOULTS — 3,453,005
QUICK-CONNECT SAFETY COUPLING
Filed April 8, 1968
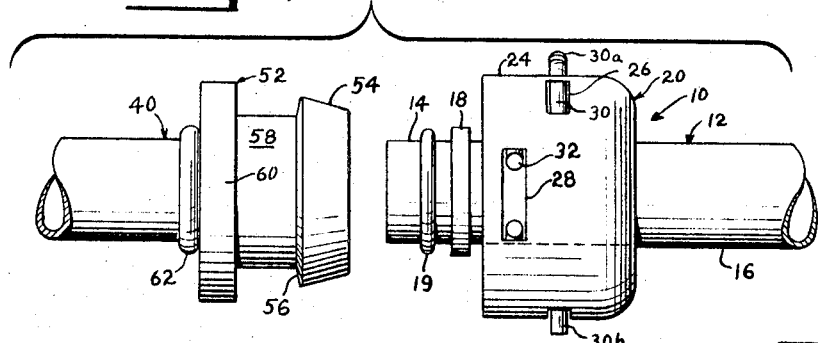
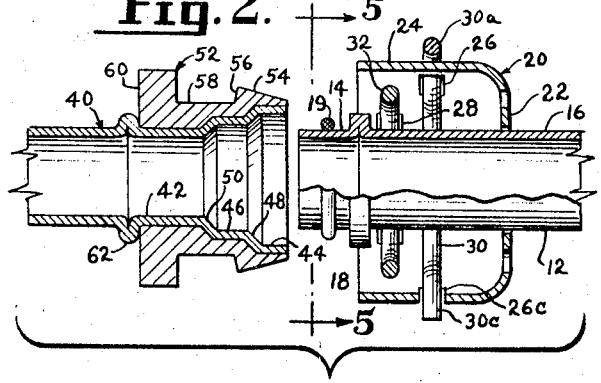
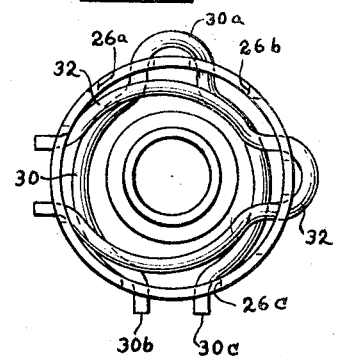
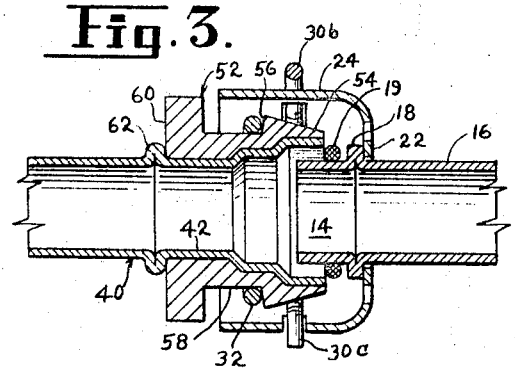
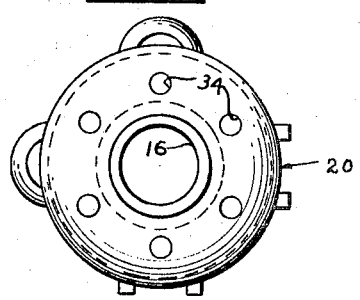
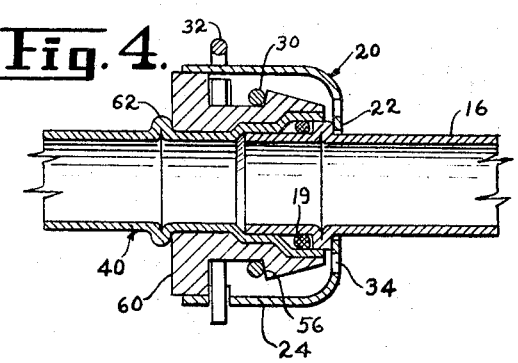
INVENTOR
Jonathan A. Foults
BY Dallett Hoopes
ATTORNEY United States Patent Office 3,453,005
Patented July 1, 1969

3,453,005
QUICK-CONNECT SAFETY COUPLING
Jonathan A. Foults, Wolcott, Conn., assignor to Scovill Manufacturing Company, Waterbury, Conn., a corporation of Connecticut
Filed Apr. 8, 1968, Ser. No. 719,397
Int. Cl. F16l 35/00, 55/00
U.S. Cl. 285—82                         3 Claims

ABSTRACT OF THE DISCLOSURE

In a quick-connect coupling a pair of clips on one element successively snap over an annular tapered flange on the other element. To disassemble, each clip must be sprung back over the flange. Any pressure in the line can vent between springing of the first clip and springing of the second clip.

This invention relates to a quick-connect coupling for ends of tubular conduits.

The prior art is replete with quick-connect couplings of various sorts. The bulk of these couplings provide for quick disconnect means as well. One of the problems with prior couplings is that the coupling being easily disconnectable has been inadvertently disconnected while the line is still under pressure. For instance, in pressurized air-conditioning lines in automobiles, mechanics have been known to disconnect a compressor line while the line has been under pressure. This has resulted in the wild thrashing about of the compressor hose and has resulted in damage and personal injury.

Under the present invention there is provided a coupling of the quick-connect variety which, although easily disconnectable, automatically vents the pressure from the line before complete disconnection is made. By this means, even the clumsiest mechanic cannot inadvertently create the situation of potential damage and injury referred to above: the coupling is vented and held together loosely until final disconnect is made.

Therefore, it is an object of this invention to provide a quick-connect coupling which may be easily disconnected but not without first automatically venting the pressure in the line.

Other objects of the invention will appear from the following description including the drawings wherein:

FIG. 1 is a side elevation of a coupling embodying my invention shown in the disassembled condition:

FIG. 2 is a disassembled view of the coupling, partly in section;

FIGS. 3 and 4 show progressively the assembly of the coupling and are in section similar to FIG. 2. FIG. 4 shows the coupling in connected condition and shows the coupling rotated 90° with respect to FIGS. 2 and 3;

FIG. 5 is a view taken from the plane of line 5—5 in FIG. 2; and

FIG. 6 is an end view taken from the left as shown in FIGS. 1 through 4.

Referring more specifically to the drawings, FIG. 1 shows a coupling generally designated 10. The male end 12 has a central tubular projection 14 and communicates with the tubular conduit 16. An annular upset 18 is provided between the projection and conduit, forming a shoulder and an O-ring 19 is provided. An annular retainer 20 surrounds the projection and comprises a radial wall 22 and an annular shell 24.

In the version shown, the shell is slotted with sets 26 and 28 of slots, the slots of each set being disposed in the same plane, radial with respect to the male end. Referring to FIG. 5, each set comprises three slots, two closely spaced slots 26a and 26b, and one larger slot 26c diametrically opposite the other two. The same is true for the set 28.

Associated with each set of slots is a modified C-shaped clip. The clip 30 has a reduced bight 30a which threads through the slots 26a and 26b as shown. The ends 30b and 30c extend through the large slot 26c. Corresponding parts of the clip 32 similarly engage the set 28 of slots. The portions of the C-shaped clips within the retainer are generally circular as shown.

The female end 40 of the coupling comprises a tubular end 42 of the conduit progressively enlarged at its mouth as shown. The mouth opening is thus stepped as at 44 and 46 with inclined shoulders 48 and 50 between the annular portions. A collar 52 is held onto the end of the conduit by the expansion of the end 42 out to the inside of the collar. The collar comprises a tapered annular flange 54, a shoulder 56, a land 58, and an outward ring 60. An upset 62 also holds the collar in position.

In assembly of the coupling, the circular tubular projection 14 is inserted into the mouth of the female opening and bottoms out on the shoulder 50. The O-ring nests between the projection and the surface 44. The retainer 20 is then brought over the female element. As shown in FIG. 3, the first clip 32 is spread by the tapered flange 54 and snaps over the shoulder 56 onto the land 58. In further assembly, the second clip 30 is likewise spread by the flange 54 and snaps over the shoulder 56 to abut thereagainst and hold the coupling in assembled condition. The retainer wall 22 abuts the upset 18, and ring 60 engages and supports the open end of retainer 20.

In disconnecting the coupling, the clip 30 is first spread or sprung by some kind of tool engaging the inner surface of the legs 30b and 30c until the central portion of the clip clears the shoulder 56. The second clip 32 then engages the shoulder 56 and holds the coupling in semi-assembled condition. At this point, any pressure in the lines is vented through the annular space between the male projection 14 and mouth of the female element. Openings 34 facilitate this venting, permitting gas to escape through the retainer. Next, the clip 32 is spread to clear the shoulder 56 and the coupling is disconnected.

Obviously, variations in the structure of the coupling are possible. For instance, the form of clip used may vary greatly as may its attachment to the shell of the retainer. It has been found, however, that the structure shown in the drawings is the preferred embodiment.

I claim:

1. For fluid conduits, a safety coupling comprising two tubular elements to be connected, one of said elements having an end and an annular flange tapered toward said end, said flange terminating opposite said end in a radially directed shoulder, the other element carrying a pair of resilient clips spaced longitudinally along that element, said clips each having an inner diameter less than the outer diameter of said shoulder, means holding the clips against longitudinal displacement in one direction with respect to the said other element, sealing means carried by one of said tubular elements and sealingly engaging said tubular elements upon their connection whereby in connection, the clips successively engage the tapered flange and snap over the shoulder and in disconnection first one clip and then the other must be successively sprung about the shoulder on the flange thereby assuring venting of pressure in the conduits past the seal means after one clip is sprung and before the other clip is sprung.

2. A quick-connect coupling for ends of tubular conduits comprising:

(a) a male end having a central tubular projection and an annular retainer surrounding said projection and fixed thereto against longitudinal movement toward the end of the projection, the retainer having longitudinally spaced therealong a plurality of sets of slot means, the slot means of each set being disposed in the same plane, radial with respect to the male end, a plurality of modified C-shaped clips fitting into the sets of slot means respectively, the bight of each of the C-shaped clips extending through one of the slot means and the ends of the clip extend through other of the slot means, the rest of each of the C-shaped clips being disposed inside the retainer; and (b) a female end receiving the male end and having a surrounding tapered annular flange adjacent and tapered axially toward its mouth, the flange presenting a radial shoulder spaced axially backward from the mouth and facing in the opposite direction from the mouth, said clips each having an inner diameter less than the outer diameter of said shoulder whereby as the female end receives the male end the C-shaped clips successively are spread by and snap over the flange shoulder, and in final assembly one of the C-shaped clips holds the coupling together by abutting the shoulder.

3. A quick-connect coupling as described in claim 2 wherein the female end also has a radially outwardly directed ring spaced axially backward from the mouth so that when the coupling is in completely assembled condition, the ring extends radially outwardly toward the inside of the retainer.

References Cited
UNITED STATES PATENTS

| | | | |
|---|---|---|---|
| 941,652 | 11/1909 | Rock | 137—583 |
| 1,580,694 | 4/1926 | Smith | 285—14 X |
| 2,260,712 | 10/1941 | Harrison | 285—321 |
| 2,757,944 | 8/1956 | Krapp | 285—153 |
| 3,314,696 | 4/1967 | Ferguson et al. | 285—305 X |
| 3,326,580 | 6/1967 | Munier et al. | 285—321 X |

CARL W. TOMLIN, *Primary Examiner.*

D. W. AROLA, *Assistant Examiner.*

U.S. Cl. X.R.

137—583; 285—321, 382.4